Nov. 27, 1962  A. E. VOGEL  3,065,976
CONTROL SYSTEM FOR VEHICLE SUSPENSION
Filed Nov. 2, 1956  6 Sheets-Sheet 1

Fig. 1.

INVENTOR.
ARTHUR E. VOGEL
BY
Schmieding and Fultz
ATTORNEYS

INVENTOR.
ARTHUR E. VOGEL
BY Schmieding and Fultz
ATTORNEYS

Fig. 5

INVENTOR.
ARTHUR E. VOGEL
BY
Schmieding and Fultz
ATTORNEYS

Fig. 9 tates Patent Office 3,065,976
Patented Nov. 27, 1962

3,065,976
CONTROL SYSTEM FOR VEHICLE SUSPENSION
Arthur E. Vogel, Columbus, Ohio, assignor, by direct and mesne assignments, of one-half to Dawson-Vogel Engineering Company, one-fourth to Warren H. F. Schmieding and one-fourth to Palmer Fultz, all of Columbus, Ohio
Filed Nov. 2, 1956, Ser. No. 620,102
24 Claims. (Cl. 280—124)

The present invention relates to suspension system for vehicles and more particularly to a novel apparatus for automatically controlling such systems.

This application is a continuation-in-part of co-pending application Serial Number 541,337 filed October 19, 1955 which is in turn a continuation-in-part of application Serial Number 519,079 filed June 30, 1955, the latter being now abandoned.

This application also relates to improvements in vehicle suspension systems of the type disclosed in my co-pending application Serial Number 332,651 filed January 22, 1953, Patent No. 2,960,349, issued November 15, 1960, which is a continuation-in-part of application Serial Number 289,602 filed May 23, 1952, the latter being now abandoned.

In general, the present apparatus is applied to motor vehicles of the type which comprise a sprung weight portion supported by four unsprung weight portions each of which includes a wheel and an independent spring means. The apparatus of the present invention includes a separate control means for each of said spring means arranged to increase and decrease the force exerted by each spring means independently of the other spring means. In addition, each control means is provided with a separate detector means adapted to sense relative movement, from a predetermined suspension configuration, between the sprung and unsprung portions at the particular spring means being controlled.

The present invention relates particularly to a novel hydraulic-pneumatic control means which also functions as a controlled spring means between the sprung and unsprung weights of the vehicle. Such hydraulic-pneumatic means is adapted to effect, in a novel manner, automatic variations in the rate of the spring means of the vehicle with such variations being effected in proportion to variations in force or load imposed on the spring means of the vehicle. Hence an appropriate spring rate for the particular load is automatically maintained. In addition, the novel hydraulic-pneumatic control means of the present invention is of a unique type that permits the elimination of all metal to metal contact between the sprung and unsprung weights of the vehicle. As a result the sprung weight of the vehicle and the occupants carried therein can be completely isolated from most of the road imposed impacts encountered by the unsprung weight with the result that the ultimate in riding comfort can be achieved.

When the vehicle encounteres inertia forces in negotiating a curve, the spring means towards the center of the curve normally unload stored spring energy in a manner which is detrimental to stability and consequently dangerous to the occupants. With the present invention applied, however, a detector and controller unit of the types described in the above mentioned co-pending application Serial Number 541,337, and also described in detail later herein, senses any tendency for the inner side of the sprung weight portion of the vehicle to move upwardly from the inner unsprung weight portions such as occurs when the sprung weight portion of a vehicle tends to lean outwardly in a curve. When such tendency is sensed, the appropriate control means are rapidly and automatically actuated, in a controlled manner, to decrease the upwardly directed force exerted by the spring means at the side towards the center of the curve being rounded. Moreover, the appropriate detector means sense the magnitude of relative movement between the sprung and unsprung portions, and command the respective control means to decrease the force exerted by an appropriate amount to maintain said sprung and unsprung portions at said predetermined relative configuration under the various magnitudes of centrifugal force to which the vehicle is subjected.

In addition to the above described functioning of the present system the apparatus is provided with a time lag mechanism of the type described in the above mentioned co-pending application Serial Number 541,337 in the response of said control means to said detector means when normal straight road conditions are being encountered. Accordingly, when road-imposed impacts are encountered at a particular spring means, the unsprung weight portion thereat will depart upwardly and dowwardly and effect movements of short time duration without effecting any substantial change in the force exerted by the spring means. When the vehicle is entering a curve, however, it is desirable to effect rapid response of the control means to inertia forces so as to achieve roll stability without the presence of an undesirable transition period at curve entry. Such undesirable transition period would occur, at the time of curve entry, if the above mentioned time delay were retained operative when centrifugal forces are encountered since then the vehicle would start to roll or lean prior to a delayed action of the control means. Accordingly, the above mentioned time delay, required to prevent actuation of the control means when road imposed impacts are encountered, in straight road operation, is automatically rendered inoperative when the vehicle encounters contrifugal forces in entering a curve. Hence the control means will rapidly apply anti-roll corrections at the time of curve entry by the vehicle, yet such control means is non-sensitive to road imposed impacts.

As an additional advantage of the invention, when the vehicle is subjected to various degrees and distributions of static loads, the detector and control means at each of the independent spring means effect an appropriate sensing and produce a corresponding controlled variation in the force exerted by each spring means to maintain said predetermined suspension configuration at all the spring means of the vehicle and for all magnitudes and distributions of static load to which the vehicle is subjected.

It is an object of the present invention to provide an improved controlled suspension system for a vehicle which system incorporates a novel controlled hydraulic-pneumatic variable rate spring means that provides a higher degree of riding comfort for the occupants of the vehicle than has been possible with prior suspension systems.

It is another object of the present invention to provide an improved controlled suspension system which permits completely independent suspension operation at each of the four unsprung portions of a vehicle, with each of said portions being adapted to sense the particular condition to which it is being subjected, and to make an appropriate corresponding variation in the force exerted by its respective spring means. As a result, improved cornering characteristics and riding comfort are realized under all road conditions to which the vehicle is subjected.

It is another object of the present invention to provide an improved control system for vehicle suspensions adapted to maintain a normal suspension configuration between sprung and unsprung weight portions of a vehicle, said control system being adapted to vary the force exerted by the spring means of the vehicle by transferring fluid energy to and from such spring means. Such transfer of fluid energy is instituted after a time delay to prevent response of the control system to road imposed impacts of short time duration. After the control system returns the sprung and unsprung weight portions to normal configuration, however, the transfer of fluid is caused to cease without such time delay whereby the sprung and unsprung weights are positively arrested at normal configuration without the occurrence of hunting or oscillation of the system above and below the normal configuration datum.

It is still another object of the present invention to provide an improved control system for vehicle suspensions which system includes a novel inertia responsive switch means that serves to rapidly render inoperative a time delay mechanism in the control system when the vehicle enters a curve so that the control system will effect anti-roll corrections at the outset of the curve. The novel switch means further includes a holding relay for automatically retaining the time delay mechanism inoperative for a time interval subsequent to completion of the curve so that the control system will rapidly remove the previously applied anti-roll correction which was required in the curve. Hence the vehicle will not remain in a banked configuration for a period after the vehicle completes the curve and the passengers of the vehicle will not be subjected to transition sensations as the vehicle leaves a curve and enters a stretch of straight road.

Further objects and advantages of the present invention will be apparent from the following description, reference being had to the accompanying drawings wherein preferred forms of embodiments of the invention are clearly shown.

Figure 3:
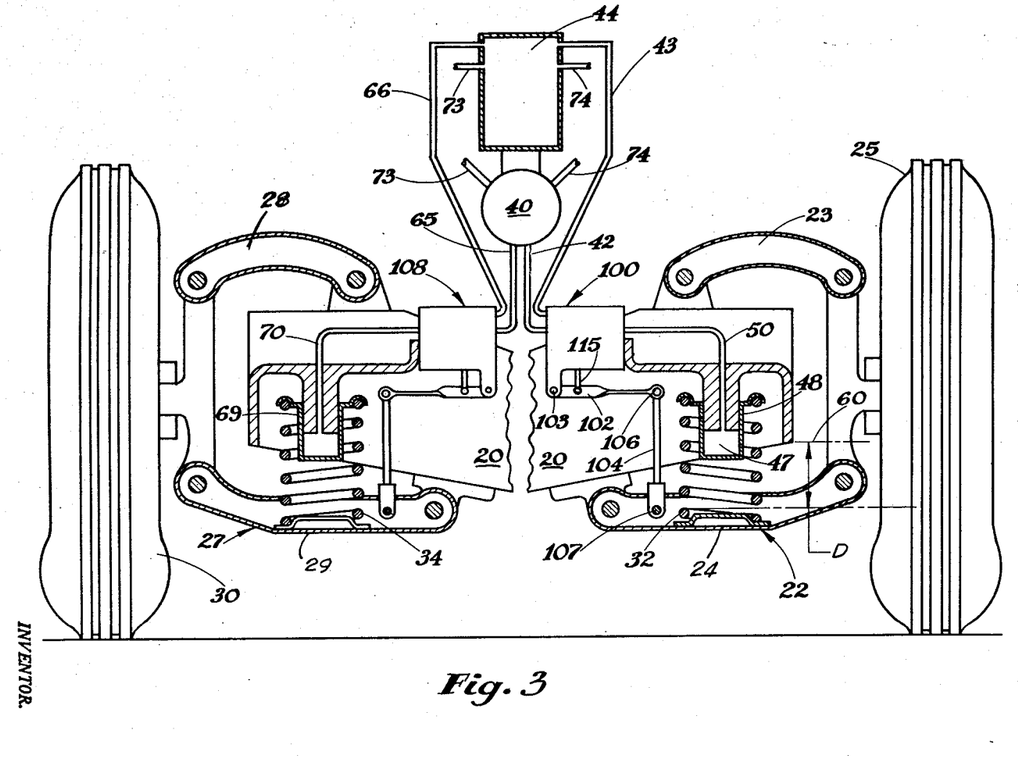
FIGURE 3 is a front schematic view of a suspension system of a motor vehicle, such suspension system being disclosed in the above mentioned co-pending application Serial Number 541,337 and illustrated in FIGURE 6 thereof which is a duplicate of FIGURE 3 of the present application.

Referring to the drawing, FIGURE 3 schematically illustrates a motor vehicle, as viewed from the front. Such vehicle includes a sprung weight portion 20 supported by four unsprung weight portions each of which includes a wheel. The left front unsprung portion is indicated generally at 22 and comprises an upper control arm 23, a lower control arm 24, and a wheel 25.

The right front unsprung portion is indicated generally at 27 and comprises an upper control arm 28, lower control arm 29 and a wheel 30.

A spring means 32 is provided between the sprung portion 20 and the unsprung portion 22. An identical spring means 34 is provided at the other side of the vehicle.

Four separate identical control means 100 and 108 may be used at each of the four wheels with a left front control means 100 and a right front control means 108 being visible in the view of FIGURE 3.

In general, the purpose of control means 100 and 108 is to vary the force exerted by spring means 32 and 34 between the sprung and unsprung weights 20 and 22. Such force variations are effected in a controlled manner so as to maintain the distance D, between the sprung and unsprung weights, substantially constant for all variations in and distributions of static and inertia loads to which the vehicle is subjected during operation.

Figure 4:
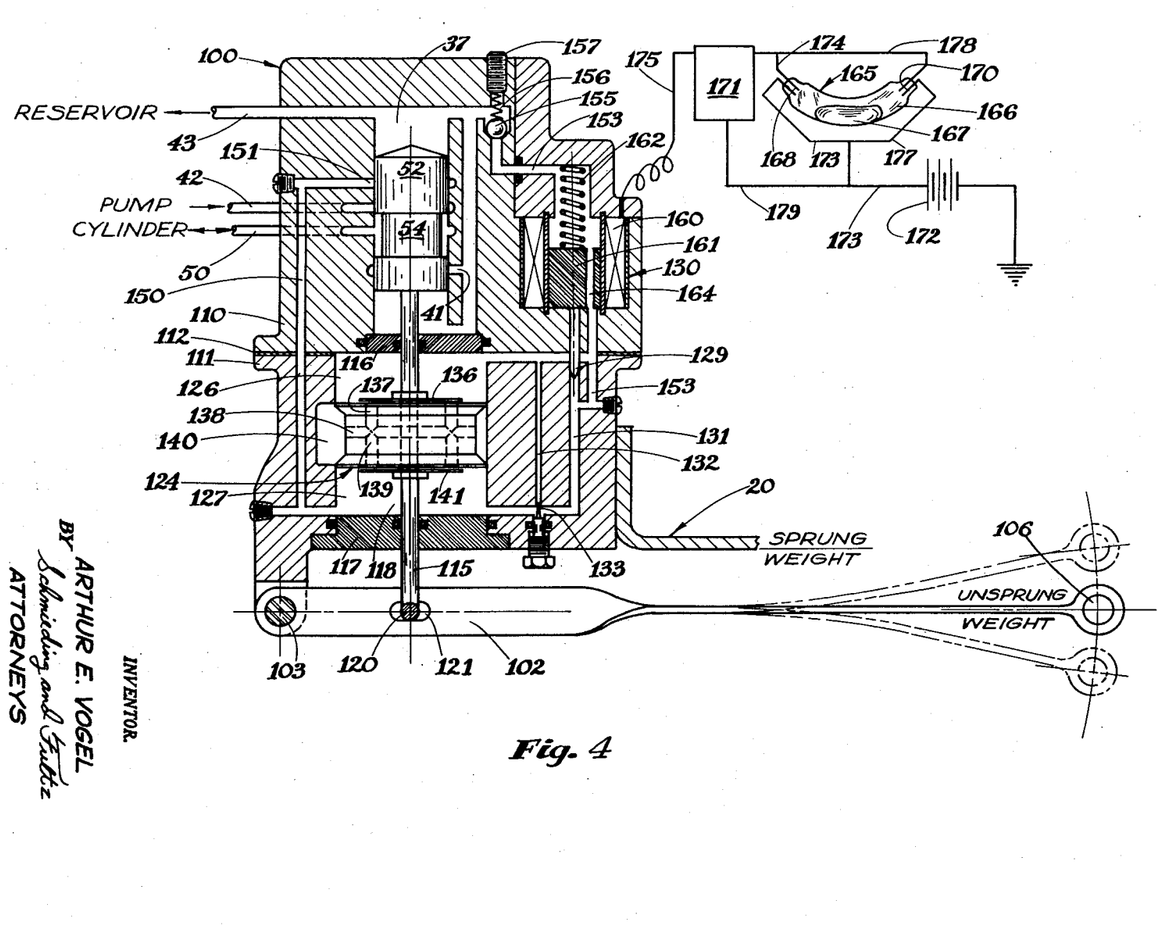
FIGURE 4 is a side sectional view of a control means comprising a portion of the systems of FIGURES 1 and 3. Such control means is disclosed in the above mentioned co-pending application Serial Number 541,337 and illustrated in FIGURE 7 thereof which is a duplicate of FIGURE 4 of the present application.

As seen in FIGURE 4, control means 100 includes an upper casing portion 110 joined to a lower casing portion 111 at a sealed junction 112.

Control means 100 further includes a spool 52 slideably fitted in a cylinder 37 and provided with a necked portion 54. When spool 52 moves upwardly, a source of high pressure, such as pump 40, delivers fluid through line 50 to the hydraulic means or cylinder 48 since line 42 is then connected to line 50 by necked portion 54 of the spool.

When spool 52 moves downwardly from the position illustrated in FIGURE 3, chamber 47 of hydraulic means or cylinder 48 is connected with reservoir 44 since the port 41, and hence the line 43, are connected to line 50 by the necked portion 54 of the spool.

When spool 52 is in the normal position illustrated in FIGURE 4, which is the case when no correction for static or inertia load variation is being made by the control means, then the chamber 47 of hydraulic means or cylinder 48 is isolated from both pump 40 and reservoir 44, and the pump and reservoir are isolated from each other, since spool 52 is then effecting isolation of the lines 42, 43 and 50 one from the other.

With continued reference to control means 100, spool 52 is connected to resilient arm 102 by a rod 115 which rod extends slideably through an upper removable wall 116 and a lower removable wall 117 of a chamber 118. The lower end of rod 115 is pivotally and slideably connected to resilient arm 102 by a pin 120 extended through a slot 121.

A valve movement retarding means, indicated generally at 124, is mounted on rod 115 and in sealed sliding engagement with the inner wall of chamber 118.

Retarding means 124 is illustrated in the normal position it occupies when the suspension system is in a normal configuration shown in FIGURE 3 in which configuration the sprung weight 20 is a normal static load distance D from the unsprung weight 22 and the spool 52 is effecting isolation of lines 42, 43 and 50 one from the other.

When retarding means 124 is urged upwardly or downwardly, from the normal position illustrated, fluid will be moved from an upper chamber portion 126 to a lower chamber portion 127, or from lower chamber portion 127 to upper chamber portion 126. So long as element 129 of a time delay valve 130 closes passage 131, as illustrated in FIGURE 4, fluid moving between chamber portions 126 and 127 must pass through a passage 132 provided with a restrictor 133 which may be formed as an adjustable threaded needle valve 133 carried by lower casing 111 and extended into the lower end of passage 132. It will be understood that the rate of movement of retarding means 124, either upwardly or downwardly from the normal position illustrated, is much slower when the element 129 is closing the larger passage 131 since, in such instance, the flow rate of fluid between chamber portions 126 and 127 is throttled by the restrictor 133. When element 129 of time delay valve 130 is removed from passage 131, however, the fluid can rapidly move between the chamber portions 126 and 127 and the retarding means 124, and spool 52 connected thereto, can move rapidly whereby corrections are rapidly instituted by control means 100.

When the time delay mechanism is operative, and rapid movement of retarding means 124 away from the normal position is prevented, then the resilient arm 102 will bend upwardly or downwardly with rapid relative movement between the sprung and unsprung weight portions, yet when one of such relative movements is retained for a time duration greater than the time delay of the system then such arm provides the necessary force for continuing the movement of retarding means 124 at the slow rate it must move when time delay valve 130 is closing passage 131. Hence it is seen that the resilient arm 102 allows rapid relative movement between sprung and unsprung weight portions 20 and 22 at times when movement of retarding means 124 is retarded and cannot follow such rapid relative movements. Accordingly, the control means is rendered inoperative when road imposed impacts of short time duration are encountered. When the vehicle encounters a static load change of relative long time duration, however, such as occurs when the number of passengers is increased or decreased, the resilient arm 102 will bend and continue to bias the retarding means 124 until slow movement thereof moves spool 52 to the appropriate position for the correction required to return the sprung and unsprung weight portions 20 and 22 to the normal configuration at which they are spaced a distance D apart.

When retarding means 124 is urged upwardly by resilient arm 102, as will occur when sprung weight 20 moves downwardly relative to unsprung weight 22, an upper resilient valve member 136 is maintained closed by fluid pressure whereby fluid cannot pass through the passages 137, 138 or 139 to lower chamber 127. Hence fluid is moved either through restricted passage 132 or through both the restricted passage 132 and the larger passage 131 depending on whether or not time delay valve 130 is open or closed.

After retarding means 124 has been moved upwardly, either rapidly or slowly depending on whether or not the time delay valve 130 is open or closed, such retarding means 124 will always move rapidly back to the normal position illustrated, after a correction has been made by the control means. Such rapid return of the retarding means 124 occurs when such retarding means is returning to the central position illustrated since the recess 140 is then in communication with lower chamber portion 127 whereby fluid pressure in such lower chamber portion 127 and recess 140 opens the resilient valve member 136 and fluid can pass readily through passages 137 and 138 and into upper chamber portion 126. Since the cross-sectional areas of passages 137 and 138 are much greater than the effective cross-sectional area of passage 132 at restrictor 133, the fluid transferred between chamber portions 127 and 126 will not slow down movement of retarding means 124 when such means is returning from an upper position until it reaches the normal position illustrated and closes by-pass recess 140.

When retarding means 124 is urged downwardly by resilient arm 102, as would occur when the sprung weight 20 rises relative to unsprung weight 22, then the lower resilient valve member 141 will be maintained closed by fluid pressure and fluid will pass from lower chamber portion 127 to upper chamber portion 126 either through the restricted passage 132 or through both the restricted passage 132 and the larger passage 131 depending on whether the element 129 of time delay valve 130 is in the closed or open position.

Retarding means 124 will return rapidly from a lower position to the normal position illustrated since upper chamber portion 126 is then in communication with recess 140 whereby fluid pressure opens resilient valve member 141 and fluid can pass directly through the passages 138 and 139 and into the lower chamber portion 127 without being forced through the restricted passage 132 until retarding means 124 closes by-pass recess 140.

Figure 7:
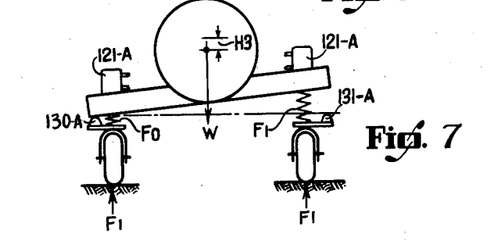

When retarding means 124 arrives at the normal position illustrated, at the completion of a return movement after a correction has been made, the side of retarding means 124 forms a closure for recess 140 in the manner illustrated in FIGURE 7.

It is desirable to provide a circulating supply of fluid through upper and lower chamber portions 126 and 127 to keep the system free of dirt as well as to remove air from the system. It is not necessary that the volumetric rate of such circulation be great but it is desirable to provide some positive pressurized flow. Accordingly, a passage 150 is provided with an inlet port 151 confronting the outer surface of spool 52. The other end of passage 150 leads to the lower chamber portion 127. Since inlet port 151 is located intermediate the high pressure pump line 42 and the low pressure portion of cylinder 37, which portion is at reservoir pressure, and since a certain small volume of fluid will always leak along the confronting walls of spool 52 and cylinder 37, such fluid leakage will enter port 151 and flow through passage 150 to the lower chamber portions 126 and 127. To complete the circuit a return passage 153 is provided, with such passage leading from the passage 131 back to the portion of the interior of cylinder 137 which is at reservoir pressure. The outlet end of passage 153 is provided with a fluid actuated check valve 155 which opens at a predetermined pressure against the action of spring 156. A screw 157 is provided for varying the relief pressure at which check valve 155 opens, with such relief pressure being set at some value less than the fluid pressure at inlet port 151 of inlet passage 150 in order to provide the desired circulation through the time delay portion of the system.

It will be understood that the pressure available for pressurizing chambers 126 and 127 will depend on the location of port 151 relative to the distance between pressurized line 42 and the top of spool 52 which is exposed to reservoir pressure. It the port 151 is centrally located between line 42 and the top of spool 52, and if the reservoir pressure is atmospheric, then the pressure available at port 151 will be approximately one half the pressure existing in high pressure line 42.

Referring next to the time delay control valve 130 of FIGURE 4, such valve includes a stationary solenoid 160 surrounding a moveable core 161 which core carries element 129. A spring 162 constantly urges core 161 and element 129 towards the closed position illustrated. When solenoid 160 is energized, however, core 161 is moved upwardly by the magnetic field of the solenoid towards a central position therein whereby the element 129 opens the larger passage 131 and the time delay mechanism is rendered inoperative in the manner previously described.

A passage 164 is provided through core 161 for the passage of fluid through the core whereby both the upper and the lower end of the core are subjected to the same fluid pressure. Hence the time delay control valve 130 is balanced with respect to fluid pressure of the system and movement thereof will be effected only by the action of spring 162 and solenoid 160.

The system of FIGURE 4 is provided with an inertia responsive control means to rapidly render the time delay mechanism inoperative when the vehicle is suddenly subjected to a horizontally exerted inertia force such as is the case when the vehicle enters a curve, or at the outset of a braking or accelerating operation. In these instances of vehicle operation it is desirable to rapidly institute an anti-roll correction at the entry of a curve, or to rapidly resist longitudinal pitching or "nose dive" of the front of the vehicle when the brakes are applied, or to rapidly resist longitudinal pitching of the vehicle during rapid acceleration thereof. By rapidly instituting the correction to be made by the control means, through rendering inoperative the time delay mechanism, lower control means pressures are required to effect stability and the passengers of the vehicle will not be subjected to unpleasant transition sensations as would be the case were the vehicle permitted to materially proceed into a roll or pitching movement before the appropriate correction is instituted by the control means 100.

With continued reference to FIGURE 4, a horizontally disposed mercury switch is generally indicated at 165. Such switch includes a tube 166 having inclined opposite ends provided with a first pair of contacts 168 and a second pair of contacts 170. A source of electric energy 172 is connected to one of the contacts 168 by wire 173 and the other of the contacts 168 is connected by wire 174 to a holding relay 171, later to be described herein, which relay is in turn connected to solenoid 160 by the wire 175. At the other end of tube 166 one of the contacts 170 is connected to the source of electric energy 172 by the wire 177 and the other of the contacts 170 is connected to the holding relay by the wire 178.

When the quantity of mercury 167 connects either the contacts 168 or the contacts 170 the solenoid 160 is actuated whereby the time delay mechanism is rendered inoperative. It will be understood that when the longitudinal axis of mercury switch 165 is disposed transversely to the longitudinal axis of the vehicle the mercury switch 165 will sense centrifugal force and render inoperative the time delay mechanism when the vehicle encounters a curve.

The same control means 100 can be also utilized to control longitudinal pitching or "nose dive" of the vehicle when the brakes are applied in slowing down or stopping. In such instances it is desirable to render inoperative the time delay mechanism of control means 100 so that an anti-pitch correction will be rapidly instituted before the vehicle has materially progressed into a pitched attitude. To accomplish this a brake operated switch 240, illustrated in FIGURE 5 and later to be described, may be connected in parallel with the mercury switch 165. Hence a single control circuit, using both mercury switch 165 and brake operated switch 240, can be utilized with control means 100 whereby such control means 100 will effect both anti-roll corrections and anti-pitch corrections.

Figure 5:
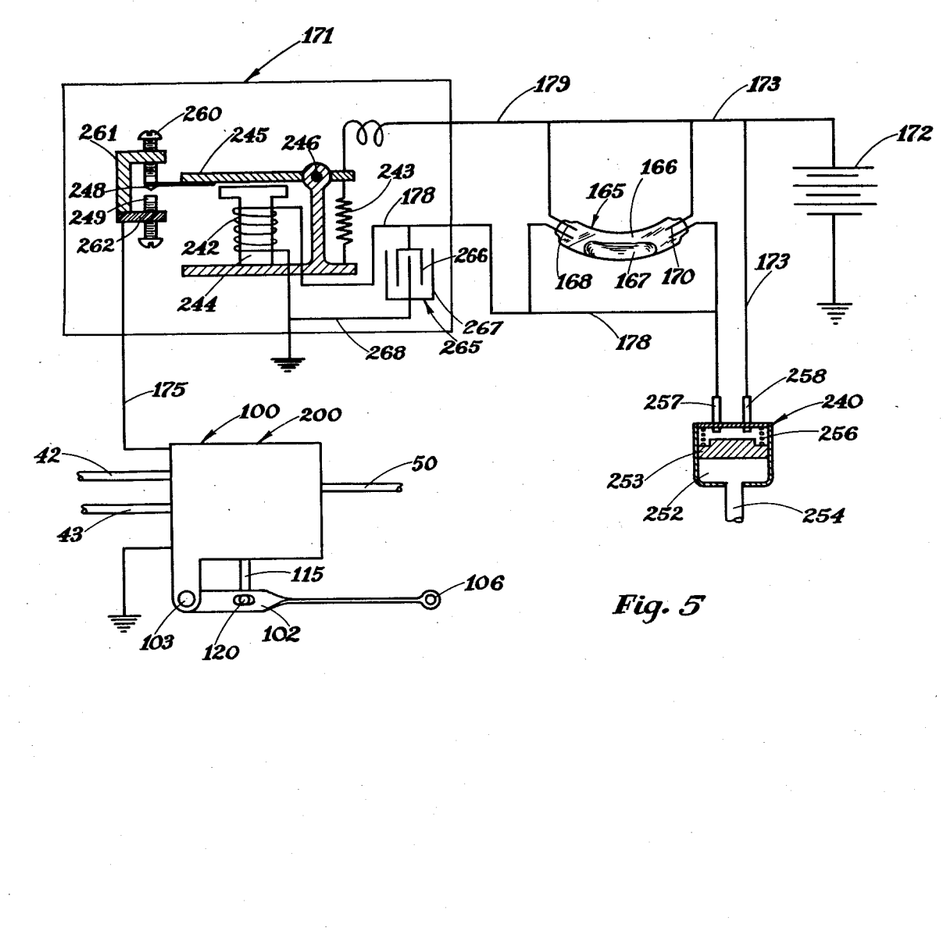
FIGURE 5 is a diagrammatic view showing an electric control apparatus utilized with the suspension systems of FIGURES 1 and 3. Such electric control apparatus is disclosed in the above mentioned co-pending application Serial Number 541,337 and illustrated in FIGURE 12 thereof which is a duplicate of FIGURE 5 of the present application.

Reference is next made to FIGURE 5 which diagrammatically illustrates an electrical sensing apparatus adapted to operate the time delay mechanisms of the previously described control means 100. A mercury switch 165 is provided with a pair of contact points 168 at one inclined end of a horizontal tube 166 and a second pair of contacts 170 at the other inclined end of horizontal tube 166. When the quantity of mercury connects either of the pair of contacts 168 or 170, which occurs when the vehicle encounters centrifugal force at curve entry, a solenoid 242 of holding relay 171 is energized and a core 244 becomes magnetized whereby pivoted arm 245 pivots on pin 246 and moves downwardly against the action of tension spring 243 to make contact between an upper contact 248 and a lower contact 249.

The mercury switch contacts 168 connect the source of electricity 172 with solenoid 242 by means of wires 173 and 178. The other mercury switch contacts 170 connect source 172 with solenoid 242 by means of wires 173 and 178.

A fluid actuated switch 240 is provided in parallel with mercury switch 165 to render inoperative the electrically operated time delay valve 130 located within the control means 100 when the vehicle encounters an inertia force which would cause longitudinal pitch of the vehicle. Such would occur when the vehicle is to be suddenly decelerated or stopped. Switch 240 includes a fluid chamber 252 fitted with a piston 253. A line 254 leading from chamber 252 can be connected to the hydraulic brake system of the vehicle, or to another suitable source of pressurized fluid. When chamber 252 is pressurized piston 253 moves upwardly against the action of a return spring 256 whereby piston 253 electrically connects a pair of contacts 257 and 258. The contacts 257 and 258 energize solenoid 242 of holding relay 171 with the source of electric energy by means of the wires 173 and 178.

The upper contact 248 of relay 171 is provided with an adjustable stop provided by a screw 260 adjustably carried by a dielectric bracket 261 mounted on metallic base 262 which base also adjustably supports lower contact 249. The dielectric bracket 261 insulates upper contact 248 from lower contact 249 when the former is in the upper position illustrated. The base 262 serves as a conductor between lower contact 249 and a wire 175 which leads to the solenoid 160 of time delay valve 130 within control means 100.

When contact 248 engages contact 249 by action of solenoid 242, then the solenoid 160 of time delay valve 130 is connected to the source of electric energy by wires 173, 179, arm 245, contact 248, contact 249, and wire 175. As seen in FIGURE 4, the element 129 opens the larger passage 131 whereby retarding means 124, and hence spool 52, will move rapidly to quickly institute an anti-roll or anti-pitch correction as required.

With continued reference to FIGURE 5, when the vehicle leaves a curve and enters a stretch of straight road it is desirable to continue to maintain the time delay mechanism inoperative for a period of time after the centrifugal force has ceased and the mercury switch 165 has broken contact, in order that the control means 100 can rapidly, without time delay, make corrections in the chambers 47, FIGURE 3, which corrections are required because centrifugal force is ceasing and the unequal spring forces, required in the curve to levelize the vehicle, are no longer required in the straight stretch of road being entered. Hence it is desirable to maintain the time delay mechanism inoperative and hence the solenoid 160 of the time delay switch 130, FIGURE 4, and the solenoid 242 of the holding relay 171 must both be maintained energized.

To maintain solenoids 242 and 160 energized after mercury switch 165 or the brake operated fluid actuated switch 240 has broken contact, a condenser 265 is connected in parallel with solenoid 242 of the holding relay. The plates 266 of the condenser are connected to wire 178 and plates 267 of the condenser are grounded by a wire 268.

When one of the switches 165 or 240 connects the source of electric energy 172 to the solenoid 242 of the holding relay, arm 245 is attracted downwardly to connect contacts 248 and 249 and condenser 265 is charged. So long as switch 162 or 240 is closed, the time delay switch 130 in the control means 100 will remain connected to the source 172 and receive electric current therefrom. When the closed switch 165 or 240 is opened, as occurs in coming out of a curve or when the brake pressure used in stopping is decreased, then the condenser 265 will begin to release its stored charge and continue to discharge for a time interval whereby solenoid 242 remains energized and the contacts 248 and 249 are maintained in engagement subsequent to opening of switch 165 or 240.

When condenser 265 discharges the arm 245 is moved upwardly against stop 260 whereby time delay valve 130 is closed and the control means 100 is rendered non-responsive to road imposed impacts of short time duration in the manner previously described.

It will be understood that each of the control means 100 of the present invention can be applied to each of the four wheels of a motor vehicle whereby anti-roll control, as well as corrections for variations in static weight changes, is effected at each of the four wheels of the vehicle. As an alternative, if it is desired to effect anti-roll control at only say the front wheels of the vehicle, then a control means 100 would be applied at each of the front wheels of the vehicle, and a structurally more simple and less expensive control means, without a time delay control valve such as solenoid operated time delay control valve 130, could be utilized at the rear wheels of the vehicle. In such latter instance, corrections for static weight distribution would be made by a control means at each of the four wheels, but only the control means 100 at the right front wheel and the control means 100 at the left front wheel would rapidly institute anti-roll corrections in the manner described in detail herein.

Figure 1:
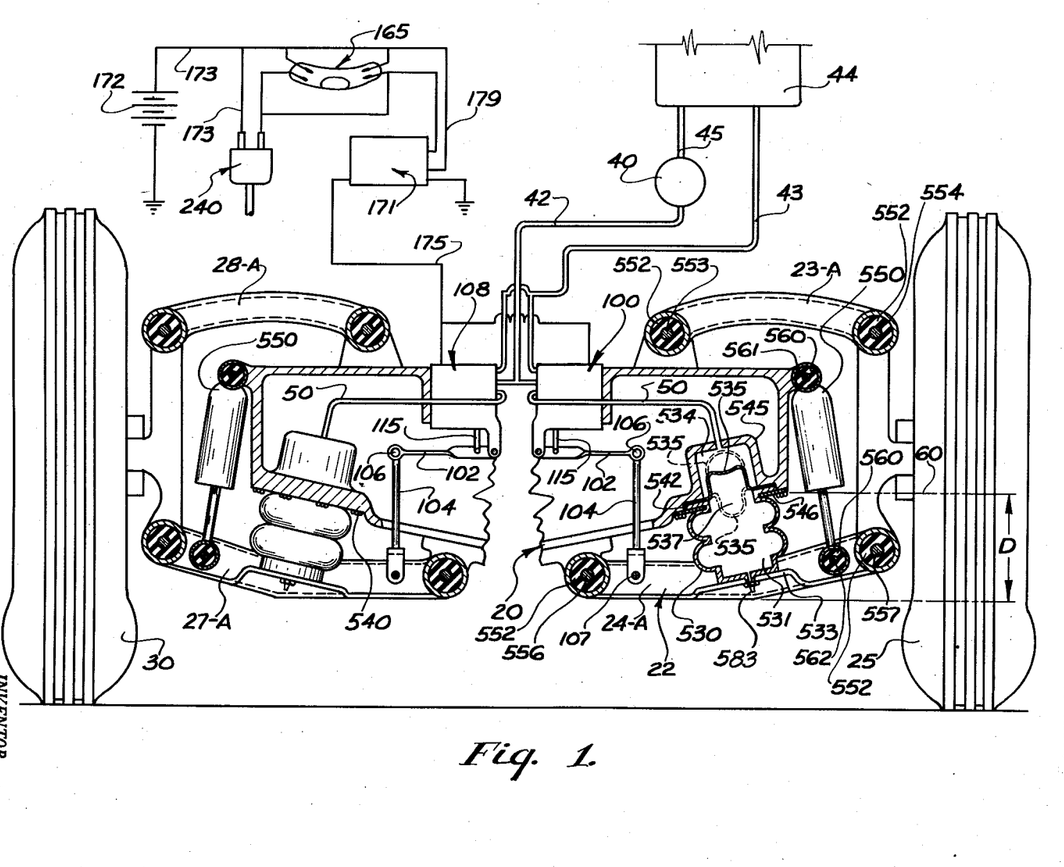
FIGURE 1 is a front schematic view showing the suspension system of a motor vehicle with a control system constructed according to the present invention applied thereto.

Reference is next made to FIGURE 1 which is a front diagrammatic view of another suspension system comprising another aspect of the present invention. The system of FIGURE 1 incorporates certain components that are identical or equivalent to components of the system of FIGURE 3 and such identical or equivalent components are designated by like numerals. The system of FIGURE 1 includes a pump 40 which receives fluid from a reservoir 44 via line 45 and delivers pressurized fluid to left and right control means 100 and 108, FIGURE 4, via line 42. Control means 100 and 108 are shown mounted to the sprung weight 20 of the vehicle and have been previously described in detail in connection with the description of FIGURES 3 and 4. Control means 100 is connected to the unsprung weight 22 of the vehicle by rod 104 pivotally connected to a lower control arm 24–A at the pivot 107 so as to be operatively responsive to relative movements between the sprung and unsprung weights 20 and 22 of the vehicle.

The upper control arm 23–A carries resilient members 552 through which pins 553 and 554 are extended. Pin 553 is mounted to the sprung weight 20 and pin 554 is mounted to the axle means. In a like manner, lower control arm 24–A carries resilient inserts 552 through which are extended pins 556 and 557 that are mounted to sprung weight 20 and the axle means, respectively.

With continued reference to FIGURE 1, a shock absorber 550 is shown operatively connected between the sprung and unsprung weight. Shock absorber 550 may be of the conventional type having a piston mounted in a cylinder containing fluid that imposes resistance to reciprocating movement of the piston in the cylinder. Resilient members 560 are carried by shock absorber 550 and pins 561 and 562 are extended through resilient members 560 and mounted to the sprung weight 20 and unsprung weight 22, respectively.

Resilient members 552 and 560 may be formed of synthetic rubber or the like and, when used in connection with the flexible spring casing 530 of the novel control means later to be described, serve to completely eliminate metal to metal contact between the sprung weight 20 and the unsprung weight 22. This feature is particularly valuable in preventing the transfer of small annoying road imposed vibrations to the sprung weight 20 and the passengers.

Referring to the left side of the suspension system of FIGURE 1 the apparatus includes a flexible casing 530 the lower end of which rests on a platform 533 formed on lower control arm 24–A. The closed lower end of casing 530 is provided with an opening having a removeable closure or valve 586 to provide means for introducing a compressible fluid such as air into a spring chamber 531 formed by casing 530 and a flexible diaphragm 535. The upper end of casing 530 is formed with an outwardly disposed flange 542 and such flange 542 and the peripheral portion of diaphragm 535 are clamped to the under side of the frame by an annular plate 546 removeably mounted to the frame by a plurality of studs 540.

As seen in FIGURE 1, fluid chamber 534 is provided by a cup-shaped member 545 which member may be integrally formed with the frame. Fluid is introduced and released from chamber 534 via a line 50 leading to the interior of control means 100. Such line 50, and its connection with the interior of the control means, are illustrated in detail in FIGURE 4.

The operation of control means 100, described in detail previously herein, serves to deliver pressurized fluid to chamber 534, and to release fluid from chamber 534, as required.

With continued reference to FIGURE 1, when pressurized fluid is delivered to chamber 534 flexible diaphragm 535 is flexed downwardly, as indicated by dotted delineation in FIGURE 1. Such downward movement of diaphragm 535 will reduce the volume of spring chamber 531 and compress the compressible fluid confined therein provided the distance D between the sprung and unsprung weights remains constant. Conversely, when fluid is released from chamber 534 diaphragm 535 will flex upwardly, as shown by dotted delineation in FIGURE 1, whereby the volume of spring chamber 531 is increased and the compressible fluid therein is allowed to expand provided the distance D between the sprung and unsprung weights remains constant.

In operation, the sprung weight 20 of the vehicle is located a normal configuration distance D from the unsprung weight as is represented by the normal configuration datum 60 in FIGURE 1. When the loading on spring chamber 531 is for any reason increased, such as occurs when the vehicle is cornering or when an increase or change in distribution of static loading is encountered, sprung weight 20 tends to move downwardly and the normal configuration distance D is decreased. This causes arm 102 of control means 100 to be moved upwardly and the control means 100 releases pressurized fluid to fluid chamber 534. This serves to compress the compressible fluid in spring chamber 531. The sprung weight 20 then moves upwardly, under said increased loading, until the sprung weight returns to the normal configuration datum at which time control means 100 cuts off the delivery of pressurized fluid to chamber 534 in the manner previously described in detail herein.

When the loading on spring chamber 531 is for any reason decreased, the sprung weight 20 will tend to move upwardly relative to the unsprung weight 22. This moves arm 102 downwardly whereby control means 100 releases pressurized fluid from chamber 534 to reservoir. The compressible fluid in spring chamber 531 is thereby allowed to expand and sprung weight 20 will move downwardly, under said decreased loading, until it reaches the normal configuration datum 60. Hence it will be understood that the suspension system of FIGURE 1 is automatically maintained at a predetermined normal configuration under variations in static loadings.

It should be pointed out that when the system of FIGURE 1 is subjected to dynamic loadings of short time duration, such as are caused by bumps in the road, the control means 100 will not admit or release fluid to or from chamber 534 since such control means is provided with the time delay mechanism, FIGURE 4, previously described in detail herein. It should also be noted that the system of FIGURE 1 will rapidly institute corrections when the vehicle enters a curve since the control means 100 includes the time delay cut-out mechanism, FIGURE 4 previously described in detail herein. Hence undesirable transition sensations will not be experienced by the passengers.

In operation of the system of FIGURE 1 the apparatus also serves to automatically vary the spring rate, i.e. the loading per unit of deflection, since the pressure of the compressible fluid in spring chamber 531 is automatically increased and decreased under increases and decreases in the loading imposed on the spring means. This feature is highly desirable from the standpoint of comfort of ride and maintaining constant the desired frequency of oscillation of the suspension.

The casing 530 and diaphragm 535 are formed of a flexible material or materials such as synthetic rubber or the like. Since flexible casing 530 forms the spring connection between the sprung and unsprung weights, it will be understood that metal to metal contact between the sprung and unsprung weights is avoided. Such metal to metal contact would of course be present if a piston and cylinder unit were used to form chamber 531 instead of the flexible casing 530, or if a coil spring were utilized in the manner of the system of FIGURE 3.

It should further be pointed out that by providing a readily accessible valve 583 for admitting or exhausting a compressible fluid to or from spring chamber 531 the quantity of fluid in the chamber can be readily established and varied as desired.

Figure 2:
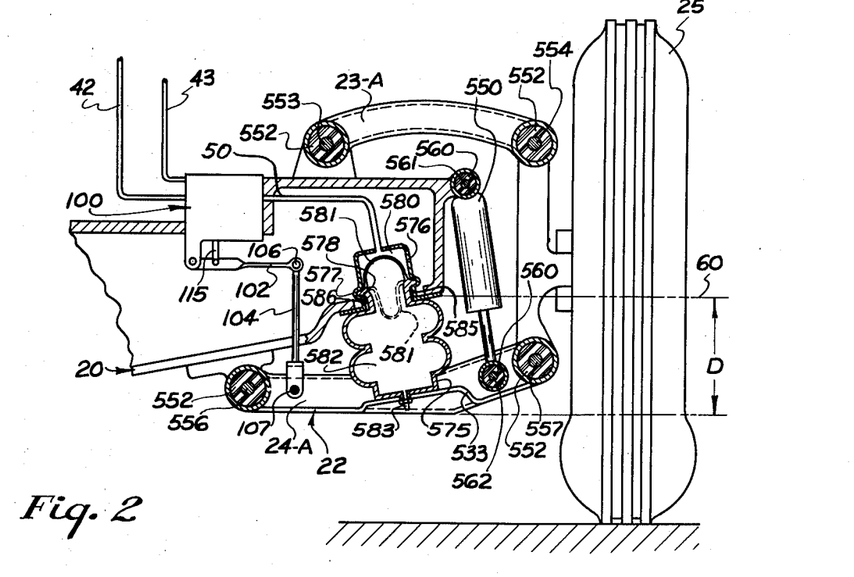
FIGURE 2 is a front schematic view showing the suspension system of a second motor vehicle with a second control system constructed according to the present invention applied thereto.

Reference is next made to FIGURE 2 which constitutes a modification of the system of FIGURE 1 which modification is constructed according to the present invention. The system of FIGURE 2 incorporates the same fluid translating system illustrated in the system of FIGURE 1 i.e. a pump 40, reservoir 44, line 42 connecting the pump with a control means 100, line 43 connecting the control means 100 with reservoir 44, and a line 50 leading to a fluid chamber 580. Certain of these elements are omitted from FIGURE 2 since they are clearly illustrated in FIGURE 1 and have been previously described in detail herein.

With continued reference to FIGURE 2 the system differs from that of FIGURE 1 in that a one piece flexible casing 575 replaces the two piece flexible casing of FIGURE 1 formed by flexible casing 530 and diaphragm 535. The sprung weight 20 in FIGURE 2 supports a cup-shaped member 576, which member may be supported in press fitted relationship in a hole in the vehicle frame as shown. The interior of cup-shaped member 576 forms a fluid chamber 580 and the inner surface 586 of such member engages the outer surface 585 of the upper end of one piece flexible casing 575. The upper end of casing 575 includes a peripherally disposed protrusion 578 which fits into a groove 577 formed in the inner surface 586 of cup-shaped member 576. Since the spring chamber 582 formed by one piece flexible casing 575 contains a compressible fluid that is at all times pressurized, it will be understood that protrusion 578 will at all times be urged by fluid pressure into groove 577 to form a fluid seal between the outer surface 585 of casing 575 and the inner surface 586 of cup-shaped member 576. This arrangement forms a positive outwardly biased fluid seal for the lower end of fluid chamber 580.

With continued reference to FIGURE 2, when fluid is added to or removed from fluid chamber 580, through line 50 and by action of control means 100 in the manner previously described for FIGURE 1, then a flexible top cover 581 of one piece flexible casing 575 will flex downwardly or upwardly in the manner diagrammatically represented by the dotted delineation 581 and the solid delineation 581 in FIGURE 2. Hence it will be understood that the internal volume of spring chamber 582 of FIGURE 2 can be decreased or increased in the same manner as the spring chamber 531 of FIGURE 1.

The system of FIGURE 2 further includes components identical to or corresponding to like components of FIGURE 1 such as upper control arm 23-A, lower control arm 24-A, sprung weight 20, unsprung weight 22, shock absorber 550, pins 553, 554, 556, 557, 561, and 562, and resilient members 552 and 560 all of which have been described in detail previously herein.

In operation, the system of FIGURE 2 functions in the same manner as the system of FIGURE 1, previously described in detail, and serves to maintain a constant distance D between the sprung and upsprung weights 20 and 22 under various static and dynamic loadings to which the vehicle of FIGURE 2 may be subjected. The system of FIGURE 2 further serves to automatically vary the spring rate, i.e. loading per unit of deflection, in proportion to variations in the static loading of the vehicle whereby the desired frequency of oscillation can be maintained under various loadings to which the vehicle is subjected. In addition, the use of flexible chamber 575 in combination with resilient members 552 and 560 eliminate all metal to metal contact between the sprung and unsprung weights. This latter feature is important in eliminating the transmission of small annoying road imposed vibrations from the upsprung weight to the sprung weight and passengers.

It should be pointed out that the cup 545 and diaphragm 535 in FIG. 1 and the cup 576 and flexible diaphragm 581 in FIG. 2 serve as releasing means which release the resilient means 530 in FIG. 1 and 575 in FIG. 2 on only one side of the body of the vehicle.

Figure 6:
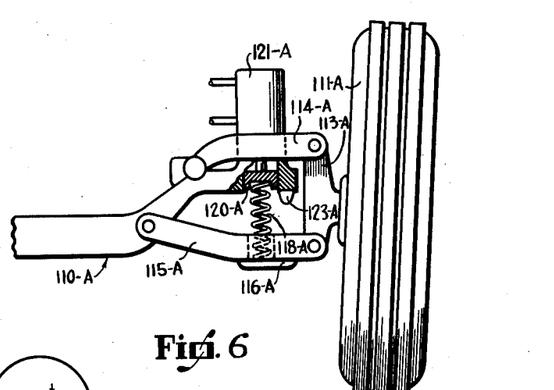
FIGURES 6 through 9 illustrate another controlled suspension system which is disclosed in the above mentioned co-pending application Serial Number 332,651 and illustrated in FIGURES 15 through 18 thereof which figures are duplicates of FIGURES 6 through 9 of the present application except that the letter "A" has been added to the numerals of FIGURES 6 through 9 of the present invention for the purpose of preventing duplication of numerals.

Referring to FIGURES 6 through 9, another aspect of the present invention is illustrated, such aspect being described in detail in co-pending application Serial Number 332,651 mentioned previously herein. FIGURE 6 is a front view of the left front wheel of a vehicle and the associated apparatus by which the present invention is adapted thereto. A main body member or frame is indicated generally at 110-A in FIGURE 6. A left front wheel 111-A is rotatably mounted to an axle member 113-A. An upper link 114-A and a lower link 115-A are each pivotally mounted between the frame and the axle member. These links serve to mount the wheel to the frame in a manner such that the wheel is free to move essentially vertically relative to the frame.

To operatively mount a spring 118-A between the wheel and the frame, a plate 116-A is secured to the underside of the link 115-A, with such plate having a suitable recess for retaining the lower end of the spring 118-A. An upper spring mount 120-A is slidably mounted in a substantially vertically disposed guide and power cylinder assembly 121-A. The guide and cylinder are carried by the frame 110-A and the guide serves to slidably carry the upper spring mount 120-A when such mount is moved upwardly and downwardly responsive to actuation of the power cylinder.

In FIGURE 6 the spring geometry is shown in normal load configuration. That is, the spring 118-A is partially compressed by the normal weight of the vehicle, and such spring is further compressible responsive to bumps in the road and inertia forces of the vehicle body. When the power cylinder is actuated, however, the upper spring mount 120-A will be moved upwardly with the result that the spring 118-A will expand to its normal uncompressed configuration. The effect of the stored energy, on the body of the vehicle, will thereby be eliminated. At the same time, the weight of the vehicle will cause the frame 110-A to move downwardly until a bumper 123-A engages the plate 116-A or the link 115-A, depending on the location of the bumper.

FIGS. 6-9 illustrate a vehicle provided with a spring releasing means illustrated in FIGS. 15-18 of the above mentioned co-pending application Serial No. 332,651. Cylinders 121-A are adapted to release the springs at each of the front wheels. The cylinders 121-A, of FIGURES 7 through 9, have related mechanism as shown in detail in FIGURE 6 so that the effect of the stored spring energy can be decreased by releasing the springs rather than confining or compressing the springs as was the case for the vehicles of FIGURES 6 through 14 of the above mentioned co-pending application Serial No. 332,651. Hence when the vehicle of FIGURE 7 is proceeding in a straight direction, and before entering a curve, the right power cylinder may be actuated to release the right front spring. In FIGURE 7 the force exerted upwardly by the ground on each front wheel is equal to the force indicated by the vector F1. The corresponding force in the left front spring is also equal to F1, but the force in the spring at the right front wheel is equal to F0 due to the fact that the cylinder 121–A has released such spring to its normally expanded configuration. At the same time, the bumper 130–A will be exerting a force of F1 upwardly on the frame of the vehicle due to the fact that the right side of the vehicle has been lowered to contact the bumper 130–A upon release of the spring at the right front wheel.

Figure 8:
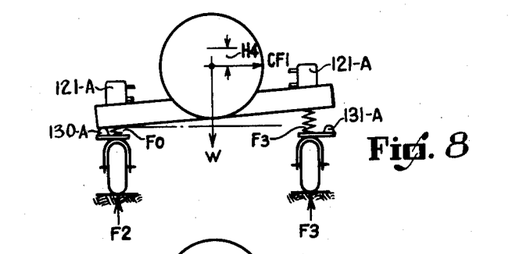

In FIGURE 8 the same vehicle is shown in the curve. At this position, due to the action of centrifugal force CF1, a greater portion of the weight W is carried by the left front wheel and the ground is pushing upwardly on such wheel with a force designated by the vector F3. The force in the spring at such wheel is also F3. At the right front wheel the ground is pushing upwardly with a lesser force indicated by the vector F2, but the force in the spring at the right front wheel is, however, still equal to F0 due to the fact that such spring was released by the cylinder 121–A. It will be seen that the center of gravity of the vehicle has been lowered a distance H4 from its original position, with such distance H4 being greater than the initial lowering H3. This increased lowering of the center of gravity results because the left front spring is compressed downwardly due to the shift of weight to the left wheel as the vehicle proceeds around the curve.

Figure 9:
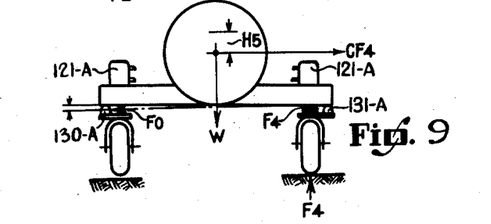

In FIGURE 9 the same vehicle of FIGURES 7 and 8 is shown at a position further around the curve at which position the right front wheel has just broken ground contact due ot the increased magnitude of centrifugal force CF4. In FIGURE 9 the left front wheel is carrying a still greater amount of weight of the vehicle and therefore the ground is necessarily pushing upwardly on such left front wheel with a force indicated by the vector F4. The corresponding spring at this wheel is also pushing upwardly on the body with a force equal in magnitude to F4. At the right front wheel, however, the spring is still released so the force in such spring is still F0 as was the case in FIGURE 7 where the spring was first released by the cylinder 121–A and before the vehicle entered into the curve. As such spring remains released throughout the entire rounding of the curve it will be seen that such spring is prevented from augmenting the centrifugal force. Hence the right front spring is prevented from adversely effecting stability, and from helping to upset the vehicle. In FIGURE 9 it may be seen that the center of gravity of the vehicle has been lowered a total distance H5.

In addition to the improved stability due to the configuration of the vehicle of FIGURES 7 through 9, the stability of such vehicle will also be increased as a result of the releasing of the spring at the right front wheel. When such spring is released, the potential energy normally stored in the spring will be released so that such energy will not be expended in doing work detrimental to stability in the manner previously described.

The control systems of FIGS. 1, 4, and 5 previously described in detail herein may be used to control the flow of fluid to and from the cylinders 120–A merely by connecting the lines 50 marked "cylinder" in FIG. 4 with the interiors of power cylinders 121–A. With this arrangement the control apparatus of FIGS. 3, 4, and 5 will function as previously described herein to admit and release fluid to and from power cylinders 121–A as may be required to stabilize the vehicle while cornering.

While the forms of embodiments of the present invention as herein disclosed constitute preferred forms, it is to be understood that other forms might be adopted, all coming within the scope of the claims which follow:

I claim:
1. In a controlled suspension system for a vehicle having sprung and unsprung weight portions, the combination of a plurality of resilient means positioned between said weight portions; each of said resilient means including a chamber containing a compressible fluid, a chamber containing a pressurized fluid, and a movable wall abutting confronting ends of said chambers and operatively positioned between said compressible fluid and said pressurized fluid; separate detector means for each of said unsprung portions, each detector means serving to sense relative movement, between its respective unsprung portion and said sprung portion, away from a normal configuration; separate control means for each of said resilient means, each control means being variably responsive to a respective one of said detector means for varying the force effect in a respective one of said resilient means, the magnitude of variation in said force effect being produced in proportion to the magnitude of inertia forces being encountered by said vehicle to maintain each of said unsprung portions at said normal configuration under various inertia forces being encountered; means for effecting a time delay in the operation of certain of said control means; electrically actuated means for rendering said time delay means operative or inoperative; and an inertia responsive switch in circuit with said electrically actuated means for energizing and de-energizing said means responsive to variations in inertia forces encountered by said vehicle.

2. In a suspension system for a vehicle having a sprung weight portion and an unsprung weight portion connected by resilient means, the combination of a plurality of said resilient means positioned between said weight portions, each of said resilient means including a chamber containing a compressible fluid, a chamber containing a pressurized fluid, and a movable wall abutting confronting ends of said chambers and operatively positioned between said compressible fluid and said pressurized fluid; a fluid pump for delivering pressurized fluid to said second mentioned chamber; means forming a zone of relatively low pressure for receiving fluid from said second mentioned chamber; valve means for connecting said second mentioned chamber either with said fluid pump or said zone, said valve means serving to isolate said second mentioned chamber from both said pump and said zone when said portions are in said normal suspension configuration; valve actuating means for operating said valve means responsive to variations in said distance between said portions; means for effecting a time delay between the occurrence of relative movement between said portions and actuation of said valve means; electrically actuated means for selectively rendering said time delay means operative or ineffective; and an inertia responsive switch in circuit with said electrically actuated means for energizing and de-energizing said means responsive to variations in inertia forces encountered by said vehicle.

3. In a suspension system for a vehicle having a sprung weight portion and an unsprung weight portion connected by resilient means, the combination of a plurality of said resilient means positioned between said weight portions, each of said resilient means including a chamber containing a compressible fluid, a chamber containing a pressurized fluid, and a movable wall abutting confronting ends of said chambers and operatively positioned between said compressible fluid and said pressurized fluid; a fluid pump for delivering pressurized fluid to said second mentioned chamber; means forming a zone of relatively low pressure for receiving fluid from said second mentioned chamber; valve means including a first position wherein said chamber is sealed from both said pump and said zone, a second position wherein said chamber is connected only with said pump, and a third position wherein said chamber is connected only with said zone; valve actuating means for effecting movement of said valve means away from said first position to certain of said other positions responsive to variations in said distance between said portions, said valve actuating means serving to return said valve means from said certain of said other positions to said first position; and retarding means for decreasing the rate of movement of said valve means away from said first position relative to the rate of return movement of said valve means back to said first mentioned position.

4. In a suspension system for a vehicle having a sprung weight portion and an unsprung weight portion connected by resilient means, the combination of a plurality of said resilient means positioned between said weight portions, each of said resilient means including a chamber containing a compressible fluid, a chamber containing a pressurized fluid, and a movable wall abutting confronting ends of said chambers and operatively positioned between said compressible fluid and said pressurized fluid; a fluid pump for delivering pressurized fluid to said second mentioned chamber; means forming a zone of relatively low pressure for receiving fluid from said second mentioned chamber; a control means mounted on one of said sprung and unsprung weight portions and including a chamber; valve means in said control means for selectively isolating said second mentioned chamber from said pump and zone, for connecting said second mentioned chamber only with said pump, and for connecting said second mentioned chamber only with said zone; a valve movement retarding means moveably carried in said chamber, said retarding means including a wall for moving fluid in one direction in said chamber and a second wall for moving fluid in another direction in said chamber; means forming a passage for transporting fluid in said chamber from one side of said retarding means to the other side of said retarding means when said retarding means is moved in said chamber, said passage including a restrictor; means forming a second passage in parallel with said first passage for conducting fluid from one side of said retarding means to the other side of said retarding means; and valve means for controlling the flow of fluid through said second passage.

5. In a suspension system for a vehicle having a sprung weight portion and an unsprung weight portion connected by resilient means, the combination of a plurality of said resilient means positioned between said weight portions, each of said resilient means including a chamber containing a compressible fluid, a chamber containing a pressurized fluid, and a movable wall abutting confronting ends of said chambers and operatively positioned between said compressible fluid and said pressurized fluid; a fluid pump for delivering pressurized fluid to said second mentioned chamber; means forming a zone of relatively low pressure for receiving fluid from said second mentioned chamber; a control means mounted on one of said sprung and unsprung weight portions and including a chamber; valve means in said control means for selectively isolating said second mentioned chamber from said pump and zone, for connecting said second mentioned chamber only with said pump, and for connecting said second mentioned chamber only with said zone; a valve movement retarding means moveably carried in said chamber and arranged to impart movement to fluid therein; means operatively connecting said valve means to said retarding means and to the other of said sprung and unsprung weight portions; means forming a passage for receiving fluid moved by said retarding means; a second valve means for controlling the flow of fluid through said passage; electrically actuated means for operating said second valve means; a source of electric energy for said electrically actuated means; an inertia responsive mercury switch for connecting and disconnecting said electrically actuated means with said source, said switch including a pair of contacts and a quantity of mercury for connecting and disconnecting said contacts; and means for retaining said electrically actuated means in an actuated position for a time interval after said quantity of mercury disconnects said contacts.

6. In a suspension system for a vehicle having a sprung weight portion and an unsprung weight portion the combination of a plurality of resilient means positioned between said weight portions, each of said resilient means including a chamber containing a compressible fluid, a chamber containing a pressurized fluid, and a movable wall abutting confronting ends of said chambers and operatively positioned between said compressible fluid and said pressurized fluid; means for varying the force exerted by said resilient means between said portions; actuating means for said means for varying said force, said actuating means being responsive to a condition to which said vehicle is subjected; time delay means for effecting a time delay between occurrence of said condition and operation of said actuating means; and control means adapted to rapidly render said time delay ineffective responsive to a second condition encountered by said vehicle, said control means being adapted to maintain said time delay ineffective for a time interval after said vehicle ceases to be subjected to said second condition.

7. In a controlled suspension system for a vehicle having sprung and unsprung weights, the combination of frame means comprising a portion of said sprung weight; a control arm having an inner end pivotally attached to said frame means and an outer end for pivotally supporting a wheel; a flexible casing containing a compressible fluid operatively positioned between said weights and including a lower end supported on said control arm and an upper end; fluid actuated means forming a chamber of pressurized fluid, said chamber including a lower end abutting said upper end of said flexible casing; means forming a moveable wall at said abutting ends of said chamber and casing and operatively positioned between said compressible fluid and said pressurized fluid; a fluid pump for delivering pressurized fluid to said fluid actuated means; means forming a zone of relatively low pressure for receiving fluid from said fluid actuated means; valve means for connecting said fluid actuated means either with said fluid pump or said zone, said valve means serving to isolate said fluid actuated means from both said pump and said zone when said portions are in said normal suspension configuration; valve actuating means for operating said valve means responsive to variations in said distance between said portions; means for effecting a time delay between the occurrence of relative movement between said portions and actuation of said valve means; means for varying the effect of said time delay means; and an inertia responsive control means for operating said means for varying the effect of said time delay means.

8. In a controlled suspension system for a vehicle having sprung and unsprung weights, the combination of a flexible casing containing a compressible fluid operatively positioned between said weights; fluid actuated means forming a chamber of pressurized fluid; means forming a moveable wall operatively positioned between said compressible fluid and said pressurized fluid; a fluid pump for delivering pressurized fluid to said fluid actuated means; means forming a zone of relatively low pressure for receiving fluid from said fluid actuated means; means forming a chamber in said fluid actuated means for receiving fluid from said pump and from which fluid is discharged to said zone; valve means including a first position wherein said chamber is sealed from both said pump and said zone, a second position wherein said chamber is connected only with said pump, and a third position wherein said chamber is connected only with said zone; valve actuating means for effecting movement of said valve means away from said first position to certain of said other positions responsive to variations in said distance between said portions, said valve actuating means serving to return said valve means from said certain of said other positions to said first position; and retarding means for decreasing the rate of movement of said valve means away from said first position relative to the rate of return movement of said valve means back to said first mentioned position.

9. In a controlled suspension system for a vehicle having sprung and unsprung weights, the combination of a flexible casing containing a compressible fluid operatively positioned between said weights; fluid actuated means forming a chamber of pressurized fluid; means forming a moveable wall operatively positioned between said compressible fluid and said pressurized fluid; a fluid pump for delivering pressurized fluid to said fluid actuated means; means forming a zone of relatively low pressure for receiving fluid from said fluid actuated means; a control means mounted on one of said sprung and unsprung weight portions and including a chamber; valve means in said control means for selectively isolating said fluid actuated means from said pump and zone, for connecting said fluid actuated means only with said pump, and for connecting said fluid actuated means only with said zone; a valve movement retarding means moveably carried in in said chamber, said retarding means including a wall for moving fluid in one direction in said chamber and a second wall for moving fluid in another direction in said chamber; means forming a passage for transporting fluid in said chamber from one side of said retarding means to the other side of said retarding means when said retarding means is moved in said chamber, said passage including a restrictor; means forming a second passage in parallel with said first passage for conducting fluid from one side of said retarding means to the other side of said retarding means; and valve means for controlling the flow of fluid through said second passage.

10. In a controlled suspension system for a vehicle having sprung and unsprung weights, the combination of a flexible casing containing a compressible fluid operatively positioned between said weights; fluid actuated means forming a chamber of pressurized fluid; means forming a moveable wall operatively positioned between said compressible fluid and said pressurized fluid; a fluid pump for delivering pressurized fluid to said fluid actuated means; means forming a zone of relatively low pressure for receiving fluid from said fluid actuated means; a control means mounted on one of said sprung and unsprung weight portions and including a chamber; valve means in said control means for selectively isolating said fluid actuated means from said pump and zone, for connecting said fluid actuated means only with said pump, and for connecting said fluid actuated means only with said zone; a valve movement retarding means moveably carried in said chamber and arranged to impart movement to fluid therein; means operatively connecting said valve means to said retarding means and to the other of said sprung and unsprung weight portions; means forming a passage for receiving fluid moved by said retarding means; a second valve means for controlling the flow of fluid through said passage; electrically actuated means for operating said second valve means; a source of electric energy for said electrically actuated means; an inertia responsive mercury switch for connecting and disconnecting said electrically actuated means with said source, said switch including a pair of contacts and a quantity of mercury for connecting and disconnecting said contacts; and means for retaining said electrically actuated means in an actuated position for a time interval after said quantity of mercury disconnects said contacts.

11. In a controlled suspension system for a vehicle having sprung and unsprung weights, the combination of a flexible casing containing a compressible fluid operatively positioned between said weights; fluid actuated means forming a chamber of pressurized fluid; means forming a moveable wall operatively positioned between said compressible fluid and said pressurized fluid; means providing a flow of fluid to and from said fluid actuated means; valve means for controlling said flow of fluid; valve actuating means for operating said valve means responsive to a condition to which said vehicle is subjected; retarding means for effecting a time delay in the actuation of said valve means; control means responsive to a condition to which said vehicle is subjected, said control means being adapted to rapidly render said retarding means ineffective when said condition is encountered, and said control means being adapted to maintain said retarding means in said ineffective state for a time interval after the vehicle ceases to be subjected to said condition.

12. In a controlled suspension system for a vehicle having sprung and unsprung weights, the combination of frame means comprising a portion of said sprung weight; a control arm having an inner end pivotally attached to said frame means and an outer end for pivotally supporting a wheel; a flexible casing containing a compressible fluid operatively positioned between said weights and including a lower end supported on said control arm and an upper end abutting said frame means; means forming a source of pressurized fluid; reservoir means; means forming a chamber of pressurized fluid connectable to said source and said reservoir, said chamber including an open lower end abutting said upper end of said flexible casing; a flexible wall overlying said open lower end of said chamber and including one side exposed to the interior thereof and the other side in pressure transmitting relationship with the compressible fluid in said flexible casing; valve means for controlling the flow of fluid to and from said chamber time delay means for controlling the operation of said valve means; and means for decreasing the effect of said time delay means responsive to a condition encountered by said vehicle.

13. The apparatus defined in claim 12 wherein said movable wall is formed by a flexible upper end wall of said flexible casing.

14. In a controlled suspension system for a vehicle having sprung and unsprung weights, the combination of frame means comprising a portion of said sprung weight; a control arm having an inner end pivotally attached to said frame means and an outer end for pivotally supporting a wheel; a flexible casing containing a compressible fluid operatively positioned between said weights and including a lower end supported on said control arm and an upper end abutting said frame means; means forming a source of pressurized fluid; reservoir means; means forming a chamber of pressurized fluid connectable to said source and said reservoir, said chamber including an open lower end abutting said upper end of said flexible casing; a flexible wall overlying said open lower end of said chamber and including one side exposed to the interior thereof and the other side in pressure transmitting relationship with the compressible fluid in said flexible casing; valve means responsive to a load to which said vehicle is subjected for controlling the flow of said pressurized fluid supplied to said chamber from said source; time delay means for controlling the operation of said valve means; and means for decreasing the effect of said time delay means responsive to a condition encountered by said vehicle.

15. In a controlled suspension system for a vehicle having sprung and unsprung weights, the combination of frame means comprising a portion of said sprung weight; a control arm having an inner end pivotally attached to said frame means and an outer end for pivotally supporting a wheel; a flexible casing containing a compressible fluid operatively positioned between said weights and including a lower end supported on said control arm and an upper end abutting said frame means; means forming a source of pressurized fluid; reservoir means; means forming a chamber of pressurized fluid connectable to said source and said reservoir, said chamber including an open lower end abutting said upper end of said flexible casing; a flexible wall overlying said open lower end of said chamber and including one side exposed to the interior thereof and the other side in pressure transmitting relationship with the compressible fluid in said flexible casing; valve means for controlling the flow of fluid to and from said chamber; a resilient member between said weights at said control arm, said member serving to prevent metal to metal contact between said weights; time delay means for controlling the operation of said valve means; and means for decreasing the effect of said time delay means responsive to a condition encountered by said vehicle.

16. In a controlled suspension system for a vehicle having sprung and unsprung weights, the combination of frame means comprising a portion of said sprung weight; a control arm having an inner end pivotally attached to said frame means and an outer end for pivotally supporting a wheel; a flexible casing containing a compressible fluid operatively positioned between said weights, said casing including a flexible side wall, a closed lower end supported on said control arm and an open upper end supporting said frame member; means forming a chamber having an open lower end and a fluid intake passage through the wall thereof; an impervious flexible member overlying said open upper end and said open lower end; and means for fastening together said flexible member and said open ends.

17. In a controlled suspension system for a vehicle having sprung and unsprung weights, the combination of means forming a chamber carried by one of said weights, said chamber including an opening, a fluid passage and an inner surface; means forming a casing including a flexible side wall and containing a compressible fluid and having one end engaging the other of said weights and the other end provided with an outer surface, one of said surfaces being provided with a protrusion inserted into a groove in the other of said surfaces; means forming an impervious flexible movable wall between said chamber and said casing; a movable wall forming a fluid seal between said chamber and said flexible casing and means for controlling the flow of fluid to and from said chamber.

18. The apparatus defined in claim 17 wherein said movable wall is formed by a flexible upper end wall of said flexible casing.

19. In a controlled suspension system for a vehicle having sprung and unsprung weights, the combination of means forming a chamber carried by one of said weights and having an open end, a groove in the inner surface thereof, and an opening for the passage of fluid into and out of said chamber; a casing including a flexible side wall and containing a compressible fluid and having one end engaging the other of said weights and the other end provided with a protrusion extended into said groove; means forming an impervious flexible movable wall between said chamber and said casing; a movable wall forming a fluid seal between said chamber and said flexible casing and means for controlling the flow of fluid to and from said chamber.

20. In a controlled suspension system for a vehicle having sprung and unsprung weights, the combination of means forming a chamber carried by one of said weights, said chamber including an opening, a fluid passage and an inner surface; means forming a casing including a flexible side wall and containing a compressible fluid and having one end engaging the other of said weights and the other end inserted into said opening in fluid sealing relationship with said inner surface; means forming an impervious flexible movable wall between said chamber and said casing; pivot means for connecting said weights; a resilient member between said weights at said pivot means, said member serving to prevent metal to metal contact between said weights; and means for controlling the flow of fluid to and from said chamber.

21. In a control suspension system for a vehicle having sprung and unsprung weights, the combination of frame means comprising a portion of said sprung weight; a control arm having an inner end pivotally attached to said frame means and an outer end for pivotally supporting a wheel; resilient means including a lower end supported on said control arm and an upper end connected to said sprung weight, said resilient means including a chamber containing a compressible fluid, a chamber containing a pressurized fluid, and a movable wall abutting confronting ends of said chambers and operatively positioned between said compressible fluid and said pressurized fluid; a source of fluid energy carried by said body means; valve means for connecting and disconnecting said second mentioned chamber with said source of fluid energy; time delay means for effecting a time delay in the operation of said valve means; and means for automatically varying the effect of said time delay means responsive to a force encountered by said vehicle.

22. In a controlled suspension system for a vehicle having sprung and unsprung weight portions, the combination of a plurality of resilient means positioned between said weight portions, each of said resilient means including a chamber containing a compressible fluid, a chamber containing a pressurized fluid, and a movable wall abutting confronting ends of said chambers and operatively positioned between said compressible fluid and said pressurized fluid; a source of fluid energy carried by said body means and connectable with said resilient means; means forming a zone of relatively low pressure for receiving fluid from said resilient means; valve means including a first position wherein said resilient means is isolated from both said source and said zone, a second position for connecting said resilient means with said source of fluid energy, and a third position for connecting said resilient means with said zone; valve actuating means for effecting movement of said valve means away from said first position to certain of said other positions responsive to variations in said distance between said portions, said valve actuating means serving to return said valve means from said certain other positions to said first position; retarding means for decreasing the rate of movement of said valve means away from said first position relative to the rate of return movement of said valve means back to said first position; and means for automatically varying the effect of said retarding responsive to a force encountered by said vehicle.

23. In a controlled suspension system for a vehicle having sprung and unsprung weight portions, the combination of a plurality of resilient means positioned between said weight portions each of said resilient means including a chamber containing a compressible fluid, a chamber containing a pressurized fluid, and a movable wall abutting confronting ends of said chambers and operatively positioned between said compressible fluid and said pressurized fluid; a source of fluid energy carried by said body means and connectable with said resilient means; valve means for connecting and disconnecting said resilient means with said source of fluid energy; time delay means for effecting a time delay in the operation of said valve means; electrically actuated means for varying the effect of said time delay; and an inertia responsive switch in circuit with said electrically actuated means for energizing and de-energizing said electrically actuated means responsive to variations in inertia forces encountered by said vehicle.

24. In a controlled suspension system for a vehicle having sprung and unsprung weight portions, the combination of a plurality of resilient means positioned between said weight portions, each of said resilient means including a chamber containing a compressible fluid, a chamber containing a pressurized fluid, and a movable wall abutting confronting ends of said chambers and operatively positioned between said compressible fluid and said pressurized fluid; a source of fluid energy carried by said body means and connectable with said resilient means; valve means including a first position wherein said resilient means is sealed from both said source and said zone, a second position for connecting said resilient means with said source of fluid energy, and a third position for connecting said resilient means with said zone; valve actuating means for effecting movement of said valve means away from said first position to certain of said other positions responsive to variations in said distance between said portions, said valve actuating means serving to return said valve means from said certain of other positions to said first position; and retarding means for decreasing the rate of movement of said valve means away from said first position relative to the rate of return movement of said valve means back to said first mentioned position.

References Cited in the file of this patent

UNITED STATES PATENTS

| | | |
|---|---|---|
| 1,869,285 | Taber | July 26, 1932 |
| 2,150,576 | Bell | Mar. 14, 1939 |
| 2,216,854 | Sanford | Oct. 8, 1940 |
| 2,226,605 | Geyer | Dec. 31, 1940 |
| 2,339,533 | Wahlberg | Jan. 18, 1944 |
| 2,650,108 | Bruce | Aug. 25, 1953 |
| 2,691,420 | Fox | Oct. 12, 1954 |
| 2,720,274 | Blomquist | Oct. 11, 1955 |
| 2,757,376 | Brueder | July 31, 1956 |
| 2,773,686 | Nash | Dec. 11, 1956 |
| 2,778,656 | May | Jan. 22, 1957 |
| 2,901,241 | Lautzenhiser | Aug. 25, 1959 |
| 2,901,242 | Elliott | Aug. 25, 1959 |
| 2,946,582 | Martin | July 26, 1960 |

FOREIGN PATENTS

| | | |
|---|---|---|
| 915,636 | France | July 29, 1946 |

OTHER REFERENCES

Ser. No. 314,406, Mercier (A.P.C.), published May 25, 1943.